J. Harrington,
Green Corn Knife,
No. 82,403.      Patented Sep. 22, 1868.
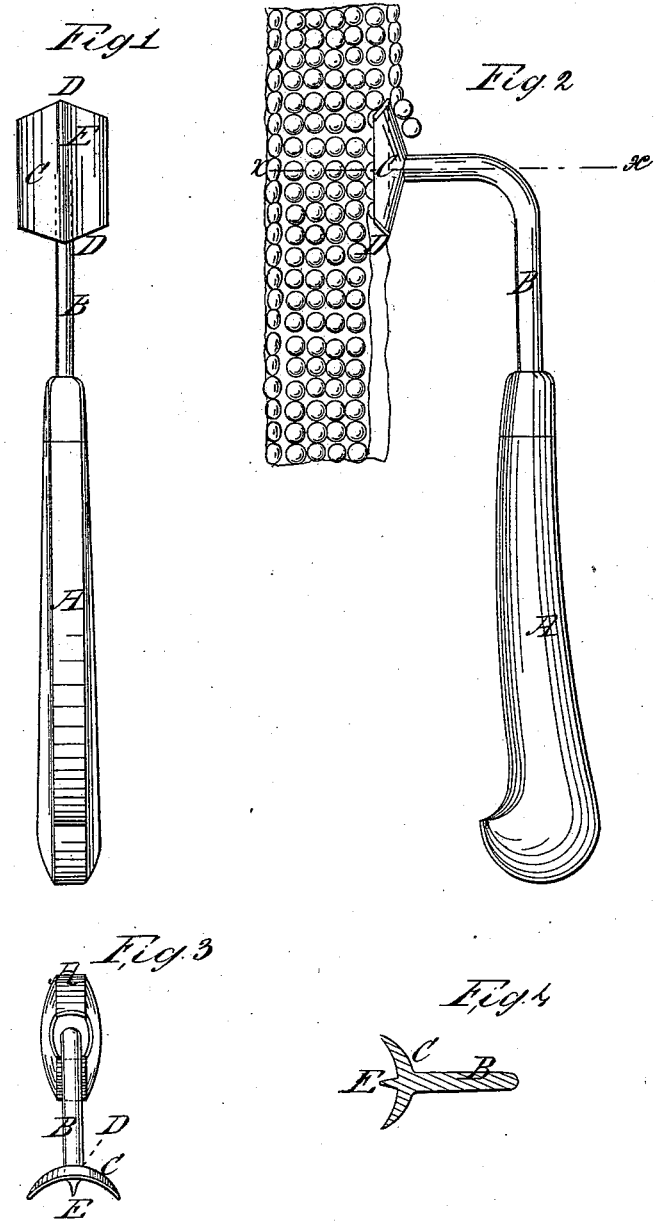
Witnesses
John Thomson
William Price
Inventor
Jackson Harrington

United States Patent Office.

JACKSON HARRINGTON, OF NEW LONDON, CONNECTICUT, ASSIGNOR TO HIMSELF AND A. C. LIPPITT, OF SAME PLACE.

Letters Patent No. 82,403, dated September 22, 1868.

IMPROVEMENT IN KNIFE FOR CUTTING GREEN CORN FROM THE COB.

*The Schedule referred to in these Letters Patent and making part of the same.*

TO ALL WHOM IT MAY CONCERN:

Be it known that I, JACKSON HARRINGTON, of New London, county of New London, and State of Connecticut, have invented a new and useful Corn-Knife for Cutting Soft Corn from the Cob; and do hereby declare that the following is a full, clear, and exact description of the same, reference being had to the accompanying drawings, making part of this specification, of which—

Figure 1 is a front elevation,

Figure 2 a side elevation,

Figure 3 a top view, and

Figure 4 a section on line $x$ $x$ of fig. 2.

This invention, relating to an article of table-cutlery, styled a "corn-knife," is intended to cut the corn from the cob of a vegetable served at table, and known as "green" or "soft corn," instead of biting the corn from off the cob with one's teeth; and consists of an ordinary handle, surmounted by a rectangular shank, having on its outer end a concave plate, whose outer and inner ends (in line of the handle) form V-shaped cutters, and has also a raised rib or guide on the concave side, between the said cutters, which prevents the knife slipping transversely off the cob as the knife is plied toward or away from the person using it, said knife being so formed as to cut in both directions, removing the corn from the cob with very little effort, and presenting in itself a neat, convenient, and finished article of table-cutlery.

In the drawings, A denotes the handle of the corn-knife, B the rectangular shank, C the concave plate, D D the V-shaped cutters, and E the guide-rib.

In using my corn-knife, one end of the corn-cob is seized between the fingers of the left hand, the other end of the cob resting on the dinner-plate, and the knife held in the right hand, forced forward and backward lengthwise of the cob, between the cob and the corn; the guide-rib at the same time being sunk in the cob, below the corn, prevents the knife slipping transversely, and thus the soft corn is removed from the cob by a neat and convenient instrument, which will be found very useful for the purpose intended.

Having described my invention, what I claim, and desire to secure by Letters Patent, is—

The concave plate C, with V-shaped cutters D D and guide-rib E, in combination with the rectangular shank B, arranged substantially as and for the purposes described and set forth.

In testimony whereof, I have hereunto set my signature, this 4th day of August, A. D. 1868.

JACKSON HARRINGTON.

Witnesses:
JOHN THOMSON,
WILLIAM PRICE.